March 24, 1942.   C. G. SUITS ET AL   2,277,421
PHOTOMETER
Filed Sept. 27, 1939   2 Sheets-Sheet 2
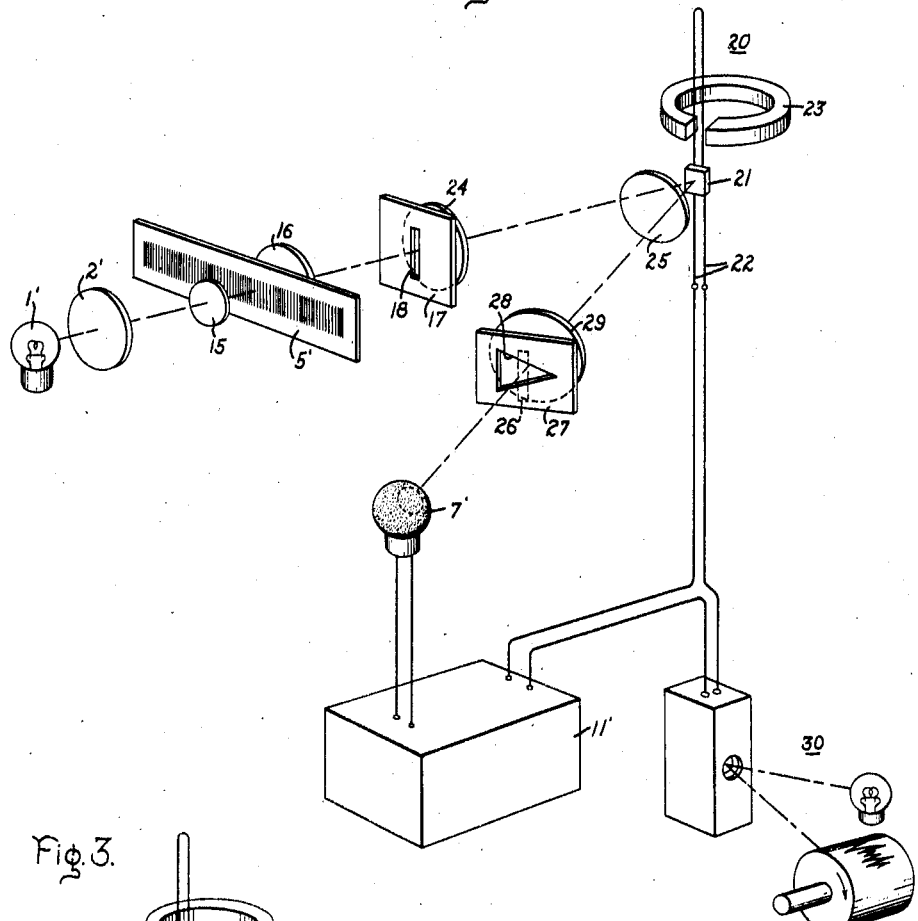
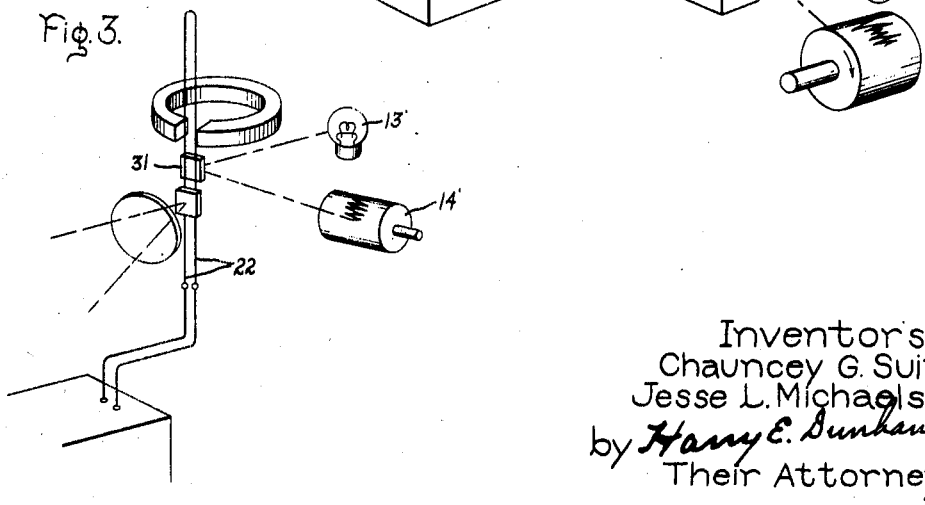
Inventors:
Chauncey G. Suits,
Jesse L. Michaelson,
by Harry E. Dunham
Their Attorney.

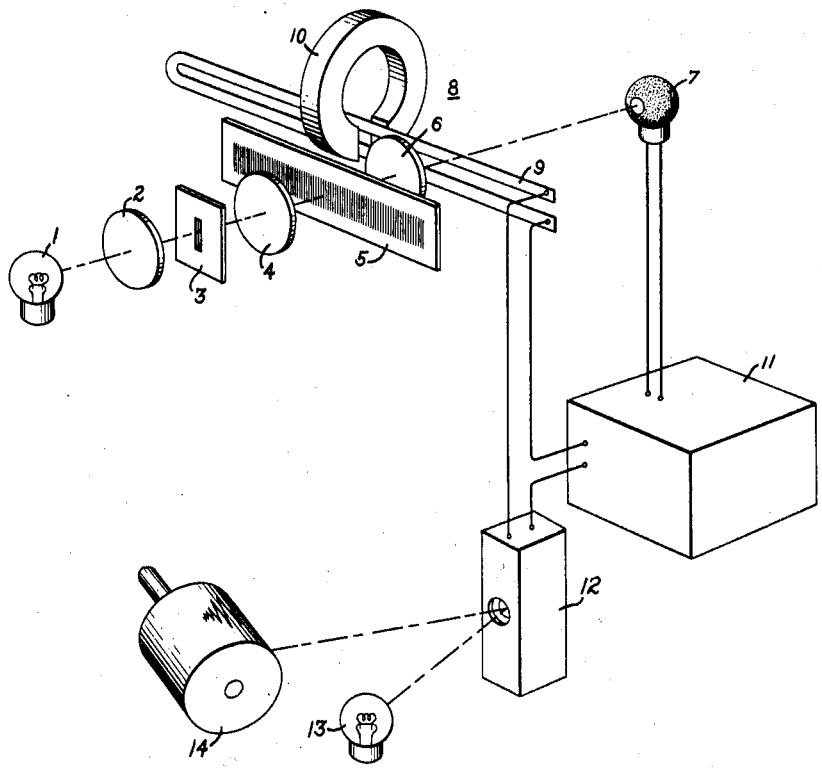

Patented Mar. 24, 1942

2,277,421

UNITED STATES PATENT OFFICE 2,277,421

PHOTOMETER

Chauncey G. Suits and Jesse L. Michaelson, Schenectady, N. Y., assignors to General Electric Company, a corporation of New York Application September 27, 1939, Serial No. 296,738

3 Claims. (Cl. 234—1.5)

Our invention relates to photometers and it has for one of its objects the provision of an improved photometer which is adapted for use in the rapid measurement of small light variations. Another object is the provision of a photometer employing a photoelectric device and an electron discharge amplifier therefor wherein the operation of the photometer is substantially unaffected by the response characteristics of the photoelectric device and the amplifier.

Our invention will be better understood from the following description taken in connection with the accompanying drawings and its scope will be pointed out in the appended claims.

Referring to the drawings, Fig. 1 is a diagrammatic representation of one embodiment of our invention; Fig. 2 is a similar representation showing a modification thereof; and Fig. 3 shows a modified form of Fig. 2.

Although our invention is applicable to various photometric uses, we have chosen to illustrate it as applied to making a record of the varying density along a spectrogram. Apparatus heretofore employed for this purpose has been slow in operation, requiring considerable time for the making of such records.

In accordance with the apparatus which we have devised and have disclosed herein, a record of a spectrogram is made while it is quickly pushed through the machine.

In Fig. 1 of the drawings, 1 represents the primary source of light which for example may be a small incandescent lamp. Light from this lamp is directed upon the slit plate 3 by the collecting lens 2. The slit which now constitutes a secondary light source is imaged by the lens 4 upon the spectrogram 5, the slit determining a narrow band of light parallel with the lines on the spectrogram. An enlarged image of the illuminated band on the spectrogram is produced in space by the lens 6 beyond which the light enters the photoelectric device 7 such as a photoelectric tube. At or adjacent to the focal point or image produced by the lens 6 is the light valve 8 which may be of any well known form comprising, for example, the pair of ribbons 9 stretched between the poles of the permanent magnet 10 in such a manner that they provide a narrow slit opening, the width of which depends upon the current passing through the ribbons. Such a device may have a high frequency response whereby it becomes in effect an extremely rapid shutter governing the amount of light in the beam entering the photoelectric device. The output of the latter connects with the input circuit of the electron discharge amplifier 11 and the output circuit of that amplifier connects with the ribbons of the light valve. The connections are so arranged that an increase in the output of the photoelectric device amplified by the amplifier 11 has the effect of moving the ribbons of the light valve in a manner to decrease the amount of the light reaching the photoelectric device. Likewise, a decrease in the intensity of the beam causes the amplified output of the photoelectric device to cause the ribbons to separate thereby admitting more light to the photoelectric device. As a result of this arrangement the amount of light received by the photoelectric device undergoes such small variations that it may be considered as substantially constant. Accordingly, the input to the amplifier is substantially constant. By this we obtain the advantage that the operation of the apparatus is substantially unaffected by the response characteristic of either the photoelectric device or the amplifier. If the light valve operates over a linear characteristic the current through the ribbons of the light valve becomes a measurement of the light intensity of the beam issuing from the spectrogram. For recording the change in current in the light valve we have shown a well known form of recorder comprising the oscillograph galvanometer 12, the light source 13 and the recording oscillograph film holder 14, the galvanometer 12 being shown connected in series with the ribbons of the light valve.

In the modification represented by Fig. 2 light collected by the collecting lens 2' from the source 1' is focused on the small lens 15 which lens, being arranged close to the spectrogram 5', produces thereon a reduced image of the lens 2'. An enlarged image of a portion of the spectrogram is produced by the lens 16 on the aperture plate 17, the aperture 18 therein serving to determine the desired narrow band of the spectrogram from which light is permitted finally to reach the photoelectric device. Beyond the aperture plate is the oscillograph galvanometer 20 which may be of any suitable and well known form and which is shown having the vibrating mirror 21 carried by the filaments 22 which pass between the poles of the magnet 23. The pupil lens 24, the mirror 21, and the small lens 25 arranged close to the mirror produce an image, represented by the dotted rectangle 26 of the aperture 18 on the photometric wedge plate 27 having therein the wedge-shaped opening 28. Close to the latter plate is the collector lens 29 which is arranged to image the mirror on the photoelectric device 1'. Because of the wedge-shaped opening in the plate 27 a movement of the mirror which shifts the aperture image toward or away from the point of the wedge varies the amount of light reaching the photoelectric device. As in the modification shown in Fig. 1 the output of the photoelectric device after being amplified by the amplifier 11' passes in series through the filaments of the galvanometer 20 and through the recording oscillograph 30 which may be the same as that shown in Fig. 1. An increase in the output of the photoelectric device upon being amplified causes the mirror to turn in a direction to move the image 26 toward the point of the wedge, hence substantially restoring the output of the device to its original value. The effect is like that described above in connection with Fig. 1 in that the amount of light reaching the photoelectric device undergoes very small variations and hence may be regarded as substantially constant whereby the output of both the photoelectric device and the amplifier are substantially unaffected by their response characteristics.

In the modified form of our invention illustrated by Fig. 3 we dispense with the oscillograph galvanometer and make the record by providing the filaments 22 with the second mirror 31 by which light from the lamp 13' is reflected on the film holder 14'.

We have chosen the particular embodiments described above as illustrative of our invention and it will be apparent that various other modifications may be made without departing from the spirit and scope of our invention which modifications we aim to cover by the appended claims.

What we claim as new and desire to secure by Letters Patent of the United States is:

1. Apparatus for measuring the rapid fluctuations of light caused by the movement of an object of varying density through a light beam comprising a source of said light beam, a photoelectric device arranged to receive the beam modified by said object, means for amplifying the output of said device, means having a high frequency response arranged in said modified beam and controlled by said amplified output for varying the light received by said device in inverse relation to the variations produced by the movement of said object, and a recording device having a high frequency response connected to be controlled by the output of said amplifier.

2. Apparatus for recording the rapid fluctuations of light caused by passing a spectrogram through a narrow beam of light having its greater transverse dimension parallel with the lines of the spectrogram comprising means for producing said narrow beam, a photoelectric device arranged to receive the beam modified by said spectrogram, means for amplifying the output of said device, a light valve having a high frequency response controlled by the amplified output of said device for varying the greater transverse dimension of said beam inversely with the intensity of the beam as modified by the spectrogram, and an oscillograph actuated by the output of said amplifier.

3. Apparatus for recording the rapid fluctuations of light caused by passing a spectrogram through a beam of light comprising a source of light, a photoelectric device, an amplifier connected therewith, means for limiting the light received by said device to a narrow beam corresponding with and controlled by the separate lines of the spectrogram, means including an oscillograph type galvanometer actuated by the output of said amplifier and having a mirror arranged to vary the amount of the beam reaching the device inversely with the intensity of the beam, and an oscillograph actuated by the output of said amplifier.

CHAUNCEY G. SUITS.
JESSE L. MICHAELSON.